US009664257B2

(12) United States Patent
Meixner et al.

(10) Patent No.: US 9,664,257 B2
(45) Date of Patent: May 30, 2017

(54) CHANGE-SPEED TRANSMISSION FOR MOTOR VEHICLES

(71) Applicant: AUDI AG, Ingolstadt (DE)

(72) Inventors: Christian Meixner, Ingolstadt (DE); Johann Märkl, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 141 days.

(21) Appl. No.: 14/438,156

(22) PCT Filed: Oct. 4, 2013

(86) PCT No.: PCT/EP2013/002991
§ 371 (c)(1),
(2) Date: Apr. 23, 2015

(87) PCT Pub. No.: WO2014/063779
PCT Pub. Date: May 1, 2014

(65) Prior Publication Data
US 2015/0252876 A1 Sep. 10, 2015

(30) Foreign Application Priority Data
Oct. 24, 2012 (DE) .......................... 10 2012 020 884

(51) Int. Cl.
*F16H 3/08* (2006.01)
*F16H 3/44* (2006.01)
(Continued)

(52) U.S. Cl.
CPC ............... *F16H 3/44* (2013.01); *F16H 3/093* (2013.01); *F16H 57/0436* (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 1,871,014 A    3/1926  Simpson
1,884,380 A   11/1926  Tenney et al.
(Continued)

FOREIGN PATENT DOCUMENTS

CH    498 317    9/1968
DE    54 30 77   1/1932
(Continued)

OTHER PUBLICATIONS

International Search Report issued by the European Patent Office in International Application PCT/EP2013/002991.
(Continued)

*Primary Examiner* — Ha D Ho
(74) *Attorney, Agent, or Firm* — Henry M. Feiereisen LLC (57) ABSTRACT

A change-speed transmission for motor vehicles, in particular manual transmission, having a plurality of forward gears and, optionally, one reverse gear, includes at least one input shaft, an output shaft and, optionally, a layshaft, between which the idler gears, which can be shifted via synchronous clutches, and the fixed gears of the gearwheel sets are arranged. At least one of the has a two-part design and is mounted in the transmission housing with mutually different axes of rotation, an annular gear stage is functionally provided between the sub-shafts and includes a internally-toothed annular gear and an externally-toothed spur gear that meshes therewith, the sub-shaft which has the larger axial distance to the other shaft bearing gearwheels of the lower forward gears and, optionally, of the reverse gear.

12 Claims, 8 Drawing Sheets

(51) Int. Cl.
  *F16H 3/093* (2006.01)
  *F16H 57/04* (2010.01)
  *F16H 63/34* (2006.01)
  *F16H 1/10* (2006.01)

(52) U.S. Cl.
  CPC ........... *F16H 63/3425* (2013.01); *F16H 1/10* (2013.01); *F16H 2200/0017* (2013.01); *F16H 2200/0052* (2013.01)

(58) Field of Classification Search
  USPC .................................. 74/330, 331, 333, 340
  See application file for complete search history.

(56) References Cited

U.S. PATENT DOCUMENTS

| | | |
|---|---|---|
| 1,987,897 A | 1/1935 | Fawick |
| 3,600,963 A | 8/1971 | Portmann |
| 3,631,947 A | 1/1972 | Laing et al. |
| 7,467,561 B2 | 12/2008 | Lee |
| 8,627,736 B2 | 1/2014 | Märkl |
| 8,727,927 B2 | 5/2014 | Meixner |
| 8,746,096 B2 | 6/2014 | Märkl |
| 9,533,562 B2 * | 1/2017 | Markl ..................... B60K 6/54 |
| 2012/0204675 A1 | 8/2012 | Märkl |
| 2012/0240699 A1 * | 9/2012 | Markl ..................... B60K 17/06 74/330 |
| 2013/0123057 A1 | 5/2013 | Märkl |
| 2013/0123058 A1 | 5/2013 | Märkl |
| 2015/0167804 A1 * | 6/2015 | Lee ........................ B60K 6/365 475/5 |

FOREIGN PATENT DOCUMENTS

| | | |
|---|---|---|
| DE | 652741 | 10/1933 |
| DE | 20 31 654 | 1/1971 |
| DE | 10 2004 020 955 | 12/2005 |
| DE | 10 2006 042 567 | 6/2007 |
| DE | 20 2006 010 877 | 12/2007 |
| EP | 2 487 385 | 8/2012 |
| GB | 280868 | 3/1928 |
| GB | 333491 | 8/1930 |
| GB | 1 515 474 | 6/1978 |
| WO | WO 2005/108822 | 11/2005 |

OTHER PUBLICATIONS

Naunheimer, Harald; Bertsche, Bernd; Lechner, Gisbert: Fahrzeuggetriebe, Berlin, Springer, 2007.

* cited by examiner

CHANGE-SPEED TRANSMISSION FOR MOTOR VEHICLES

CROSS-REFERENCES TO RELATED APPLICATIONS

This application is the U.S. National Stage of International Application No. PCT/EP2013/002991, filed Oct. 4, 2013, which designated the United States and has been published as International Publication No. WO 2014/063779 and which claims the priority of German Patent Application, Serial No. 10 2012 020 884.7, filed Oct. 24, 2012, pursuant to 35 U.S.C. 119(a)-(d).

BACKGROUND OF THE INVENTION

The present invention relates to a change-speed transmission for motor vehicles, in particular a manual transmission.

U.S. Pat. No. 1,987,879 discloses a manual transmission with two forward gears in which a ring gear stage is used for achieving different transmission ratios. Hereby a gear wheel on a layshaft outputs directly onto the externally splined ring gear, or onto a further gear wheel on the layshaft via an axially offset shaft onto a gear wheel, and this gear wheel via the shaft onto a spur gear, which meshes with an internal spline of the ring gear. The resulting design of the transmission is relatively complicated and hardly feasible for transmissions with more than two forward gears and optional reverse gear.

SUMMARY OF THE INVENTION

It is an object of the invention to propose a change-speed transmission of the generic type, which has a relatively simple construction while enabling greater constructive freedom, in particular regarding the achievable spacing of the transmission ratios.

The object is solved with the features set forth in the independent patent claim. Advantageous refinements and embodiments of the invention are the subject matter of the dependent claims.

According to the invention it is proposed that at least one of the shafts is configured two-part and is supported in the transmission housing with different rotation axes, in that a ring gear stage with an internally splined ring gear and an externally splined spur gear which meshes with the ring gear is functionally provided between the subshafts, wherein the subshaft with the greater axial distance to the other shaft carries gear wheels of the lower forward gears and optionally of the reverse gear. The ring gear stage thus already has an influence on the transmission ratios for multiple gears arranged in force flow upstream or downstream and also enables a greater axial distance of the corresponding subshaft to the neighboring shaft resulting in an improved accommodation of larger gear sets which enable lower transmission ratios. This enables beside a simpler, compact transmission design for example in the case of six forward gears and a reverse gear, a spacing in the transmission ratios of 6 or more.

The ring gear can advantageously be provided on the input shaft or on the output shaft between the gear sets of the higher forward gears and the gear sets of the lower gears.

In an alternative, advantageous embodiment of the invention the ring gear can be arranged between the continuous input shaft or the continuous output shaft and a reverse driving ring gear, wherein the ring gear again has a greater axial distance to the output shaft and carries the gear wheels of the lower gear sets.

In a particularly preferred refinement, the drive connection can be interrupted on the ring gear stage via a shiftable clutch. In particular when the ring gear stage is arranged together with the shiftable clutch on the input shaft and the idler gear wheels of the corresponding lower gear sets are positioned on the output shaft, this enables a partial switching off of the transmission elements with the advantage of a particularly good efficiency of the transmission in the higher forward gears, wherein the gear sets of the lower forward gears and optionally the reverse gear stand still, i.e., do not generate any transmission losses.

In a motor vehicle with four-wheel drive the ring gear stage can also be arranged on the input shaft and the output shaft can be a hollow shaft, through which an output shaft of the integrated interaxial differential extends, wherein the output shaft outputs onto the differential housing of the interaxial differential and the one output shaft outputs onto an opposing axial differential. This solution is particularly advantageous for the transverse mounting of a drive aggregate as well as for the longitudinal mounting, wherein only the final drive has to be correspondingly adjusted (bevel gear drive or spur wheel drive, etc.)

In a so-called standard drive, in which the input shaft and the output shaft are arranged coaxial, it is proposed that the ring gear stage is arranged on the layshaft, which carries the gear wheels, which significantly simplifies the construction of the transmission (in contrast to the aforementioned known construction).

In an advantageous refinement of the invention, for example for automatically shifted change-speed transmissions, the ring gear stage can at the same time be configured as gear wheel pump or crescent pump for delivering lubricant oil or hydraulic oil. With this the ring gear stage can serve an additional function given a corresponding configuration of the housing (suction and pressure chambers), integrated channels), which removes the requirement for a separate delivery pump to supply the transmission control, which is advantageous in terms of construction and manufacture.

Finally in a further advantageous application the ring gear can be arranged on the output shaft and additionally have an external spline, which in connection with a pawl, which is provided pivotal in the housing, forms a parking lock or an output stage of the transmission.

BRIEF DESCRIPTION OF THE DRAWING

In the following multiple exemplary embodiments of the invention are explained in more detail by way of the included block diagrams.

It is shown in.

DETAILED DESCRIPTION OF PREFERRED EMBODIMENTS

Figure 1:
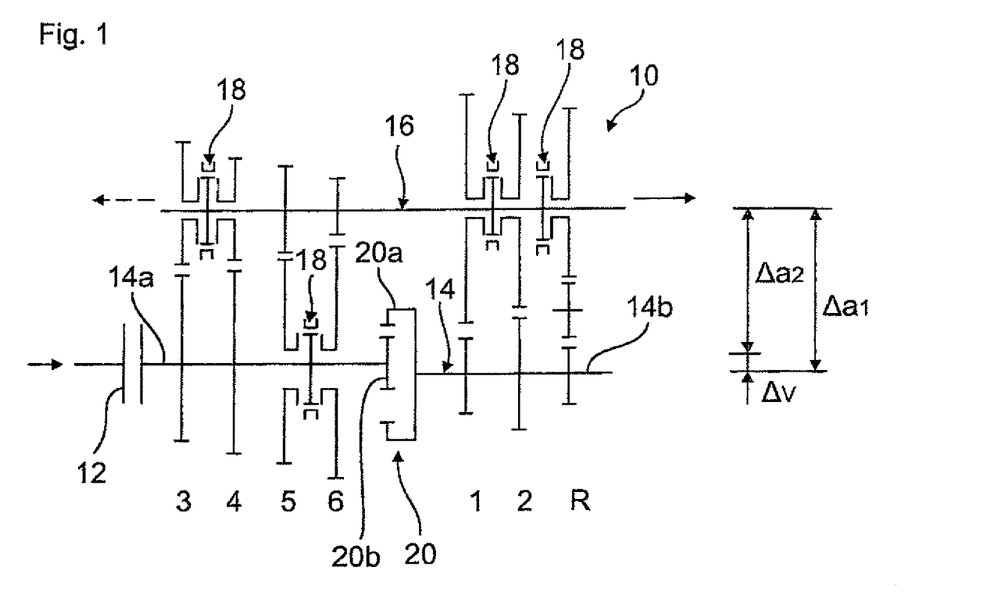
FIG. 1 a transmission for motor vehicles with six forward gears and a reverse gear, whose gear sets are arranged on an input shaft and an output shaft, and with a ring gear stage on the two-part input shaft, which is provided between lower and higher gear sets.

FIG. 1 shows as block diagram and a change-speed transmission or manual transmission 10 for motor vehicles without transmission housing, with an input shaft 14 which can be connected with a drive aggregate (not shown) via a separating clutch 12, and an output shaft 16.

Between the shafts 14, 16 meshing gear wheels of gear sets for six forward gears 1 to 6 and a reverse gear R are arranged. The idler gear wheels of the gear sets 1 to 6 and of the reverse gear R are shiftable in a known manner via only schematically indicated synchronous clutches 18 and can thus be connected with the corresponding fixed gear wheel on the respective other shaft 14, 16.

The two-part input shaft 14 of the transmission 10 is connected via a ring gear stage 20 with a ring gear 20a, which has a greater diameter and internal spline, and with a spur gear wheel 20b, which is in engagement with the ring gear 20a, wherein the subshaft 14a which carries the spur gear wheel 20b, carries the gear wheels of the gear sets 3 to 6 and the subshaft, which is connected with the ring gear 20a, carries gear wheels of the gear sets 1, 2 and R.

While the continuous, one-part drive shaft 16 is supported rotatable in the transmission housing via a first rotation axis, the rotation axes of the subshafts 14a, 14b of the input shaft 14, which are axially parallel thereto, are offset relative to each other with an axial offset of a few millimeters, as can be seen. Hereby the subshaft 14b, which carries the ring gear 20a, has a greater distance $\Delta a_1$ to the output shaft 16b than the subshaft 14a which is arranged with a smaller axial distance $\Delta a_2$.

As a result of the configuration of the ring gear stage 20 (diameter, number of teeth) the desired axial offset $\Delta_v$ and the transmission ratio of the ring gear stage 20 can be defined. The axial offset $\Delta_v$ also enables greater constructive freedom regarding the configuration of the transmission ratio and the accommodation of the lower forward gears 1, 2, which are situated on the subshaft 14b, and optionally the reverse gear R.

FIGS. 2 to 8 show alternative exemplary embodiments of the invention, which in order to avoid repetition, are only described insofar as they significantly differ from the exemplary embodiment of FIG. 1. Functionally same parts are provided with the same reference signs.

Figure 2:
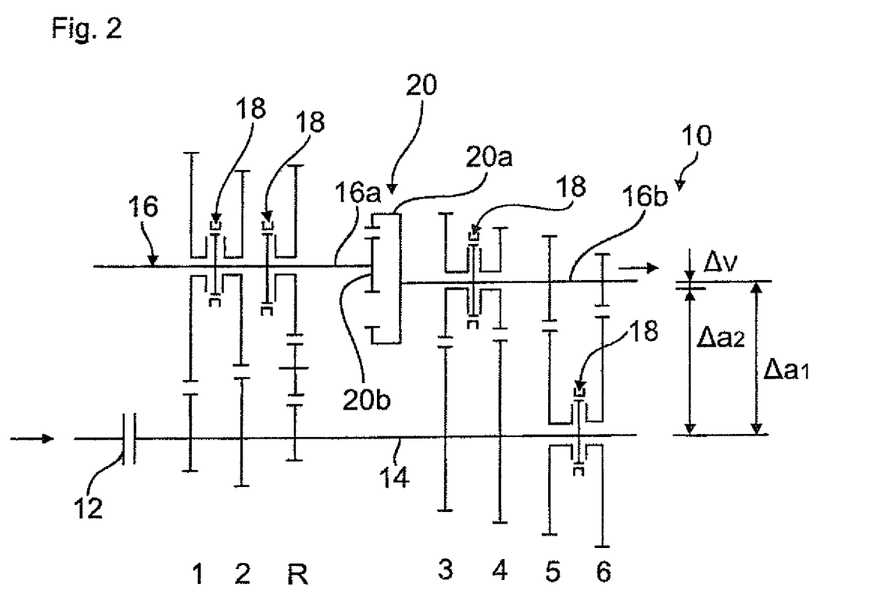
FIG. 2 the manual transmission according to FIG. 1, in which the ring gear stage is arranged on a two-part output shaft.

According to FIG. 2 the ring gear stage 20 is arranged on the output shaft 16 of the transmission 10.

For this the output shaft 16 is constructed two-part with a subshaft 16a and a subshaft 16b with the ring gear stage 20 arranged there between. On the subshaft 16a, which has a greater axial distance a1 to the one-part input shaft 14, the spur gear wheel 20b and the gear wheels of the lower gear sets 1, 2 and R are arranged, while the second subshaft 16b carries the gear wheels of the higher gear sets 3 to 6.

Figure 3:
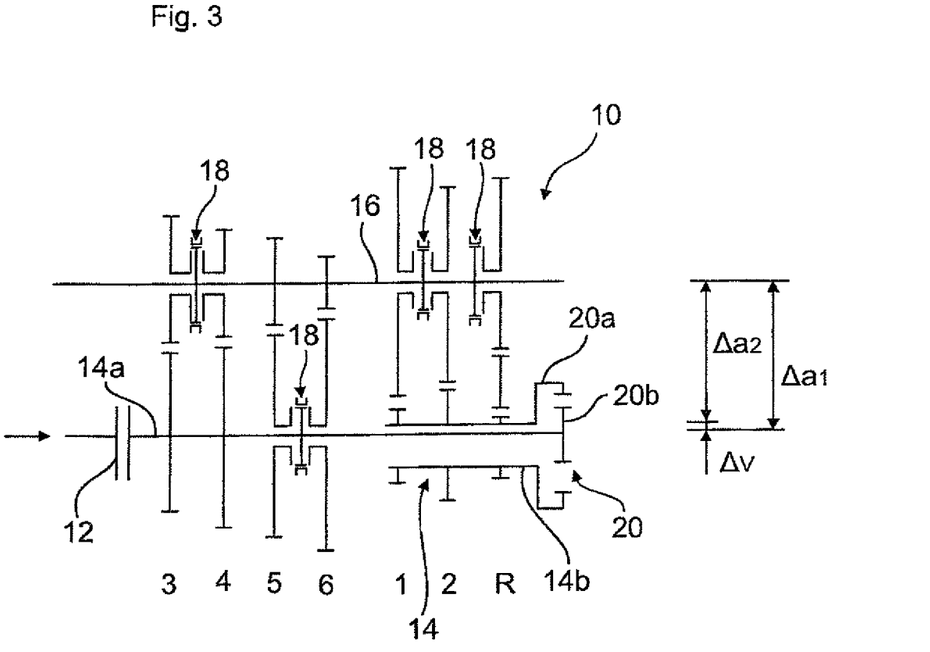
FIG. 3 a manual transmission according to FIG. 1 in which the ring gear stage is provided between a continuous input shaft and a reversed riving hollow shaft, which carries gear wheels of the lower gear wheel sets.

FIG. 3 shows an alternative configuration of the two-part input shaft 14 of the transmission 10 compared to FIG. 1, in which the ring gear stage 20 is arranged on a front side end of the input shaft 14 or on the continuous subshaft 14a and on a reverse driving hollow shaft 14b as second subshaft or respectively drivingly connects the latter.

The hollow shaft 14b, which has a greater distance a1 to the output shaft 16, carries the ring gear 20a and the gear wheels of the lower gear sets 1, 2 and R, while the first subshaft 14a is drivingly connected with the spur gear wheel 20b of the ring gear stage 20 and the gear wheels of the higher gear sets 3 to 6.

Figure 4:
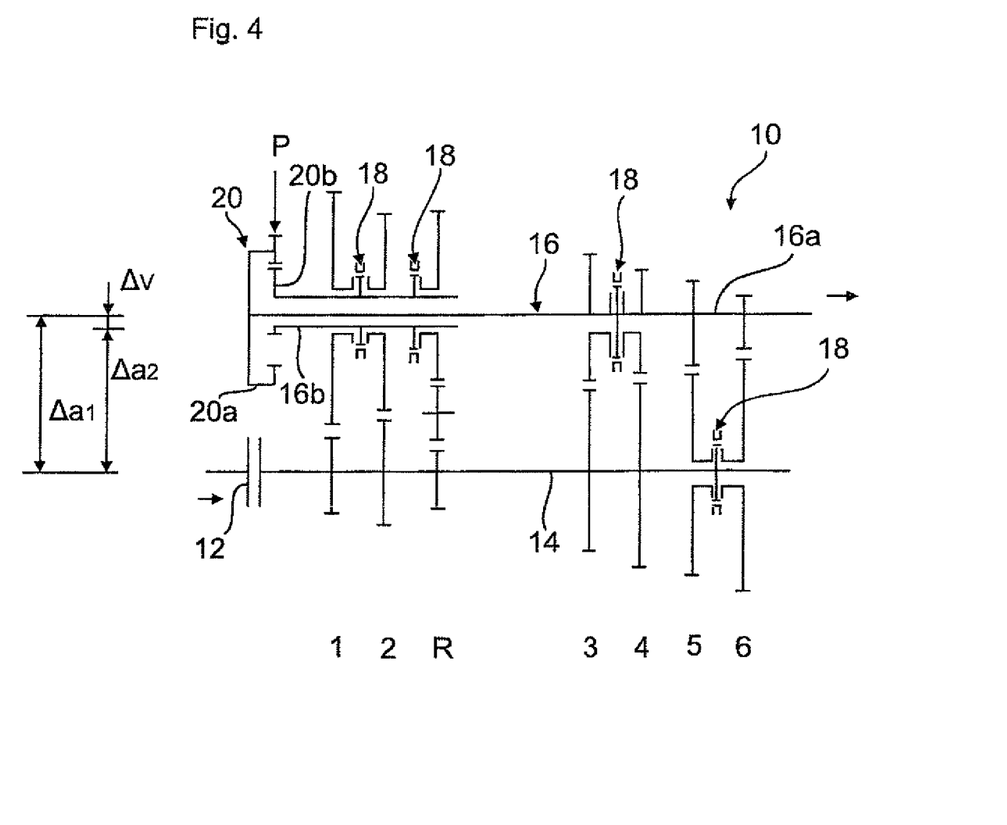
FIG. 4 a manual transmission according to FIG. 1 in which the ring gear stage is arranged between a continuous output shaft and a hollow shaft, which carries the gear wheels of the lower gear wheel set.

In the exemplary embodiment according to FIG. 4 the ring gear stage 20 is provided on the one front side end of the two-part output shaft 16.

For this the output shaft 16 has a continuous subshaft 16a and a reverse driving hollow shaft 16b, which are drivingly connected with each other by means of the ring gear stage 20.

The subshaft 16a carries hereby a ring gear 20a and the gear wheels of the lower gear sets 1, 2, R, and has correspondingly a greater axial distance a1 to the one-piece input shaft 14 than the hollow shaft 16b with the spur gear wheel 20b and the gear wheels of the higher gear sets 3 to 6.

In contrast to the ring gear stages 20 described above, the ring gear 20c is additionally provided with an external spline which in cooperation with a pawl (not shown), which is pivotally arranged in the transmission housing forms a parking lock P. When the pawl is retracted, the ring gear 20c, and with this the outputting subshaft 16a in the transmission housing of the transmission, is blocked. Optionally the external spline can also be used as output stage.

Figure 5:
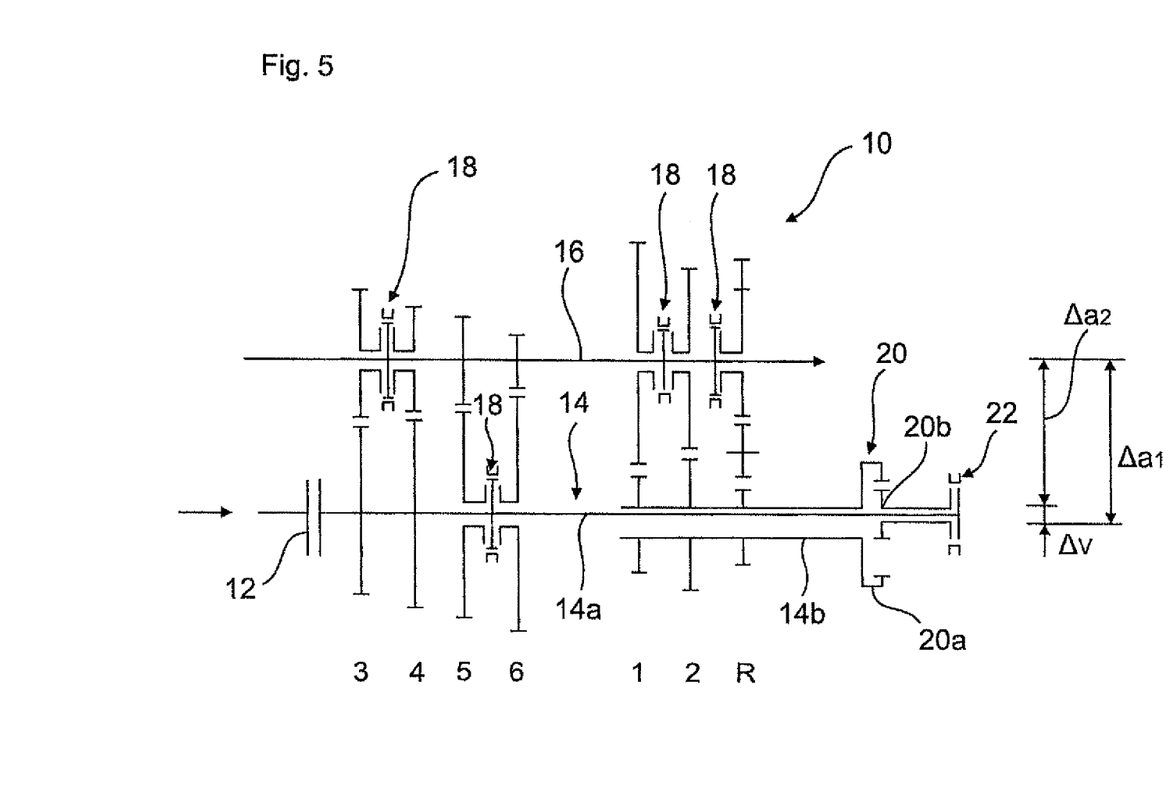
FIG. 5 a manual transmission according to FIG. 3 in which the ring gear stage has a switching clutch by means of which the corresponding hollow shaft is switchable.

FIG. 5 shows an alternative exemplary embodiment to FIG. 3, in which the driving connection can be interrupted via the ring gear stage 20 on the input shaft 14 of the transmission 10 by means of a shifting clutch 22 (this can for example be a synchronous clutch 18 common in transmissions.

When the shifting clutch 22 is engaged, the spur gear wheel 20b of the ring gear stage 20 is coupled with the continuous subshaft 14a, while it can freely rotate on the subshaft 14a, when the switching clutch 22 is disengaged.

The gear wheels situated on the hollow shaft 14b of the lower gear sets 1, 2, R are fixed gear wheels, which are in engagement with idler gear wheels on the output shaft 16, which idler gear wheels can be shifted via synchronous clutches 18.

While the arrangement fixed gear wheels—idler gear heels of the gear sets 1 to 6 and R on the input shaft 14 and the output shaft 16 in the exemplary embodiments can be configured by constructive considerations, it is a characterizing feature of the embodiment of FIG. 5 that the fixed gear wheels of the gear sets 1, 2 and R are positioned on the hollow shaft 14b. As a result all gear wheels of the gear sets 1, 2 and R stand still when the hollow shaft 14b is decoupled in the higher gears 3 to 6, i.e., they do not cause drive losses or wear.

Figure 6:
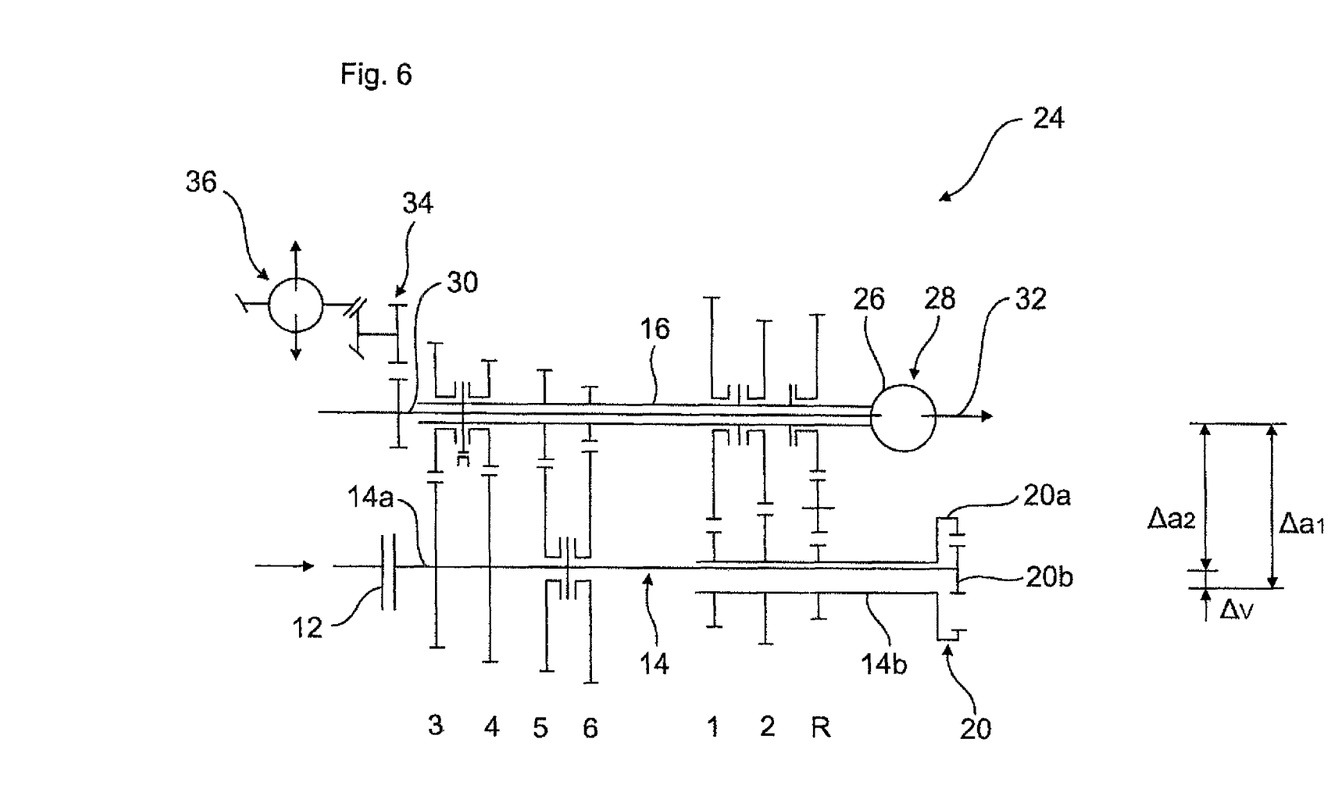
FIG. 6 a manual transmission for a four wheel drive motor vehicle with a ring gear sage on the input shaft, an output shaft configured as hollow shaft, which outputs onto an integrated interaxle differential, whose output shafts are drivingly connected with a front axle differential and a rear axle differential.

FIG. 6 shows a further exemplary embodiment of the invention with a transmission 24 for all-wheel drive motor vehicles, in which the output shaft 16 is configured as hollow shaft, on which the gear wheels of the gear sets 1 to 6 are arranged.

The input shaft 14 is again constructed two-part with a subshaft 14a and a hollow shaft 14b, which are interconnected via the ring gear stage 20 as described above.

The output shaft 16 outputs onto the differential housing 26 of an interaxle differential 28 which is integrated in the transmission housing, and whose one output shaft 30 drives a front axle differential 36 of the motor vehicle via a spur gear drive 34, while the second output shaft 32 outputs onto the rear axle of the motor vehicle in a not further shown manner.

The shown transmission 24 may be used for the longitudinal mounting as well as for a transverse mounting in the motor vehicle. The same applies to the transmissions 10 described above.

Figure 7:
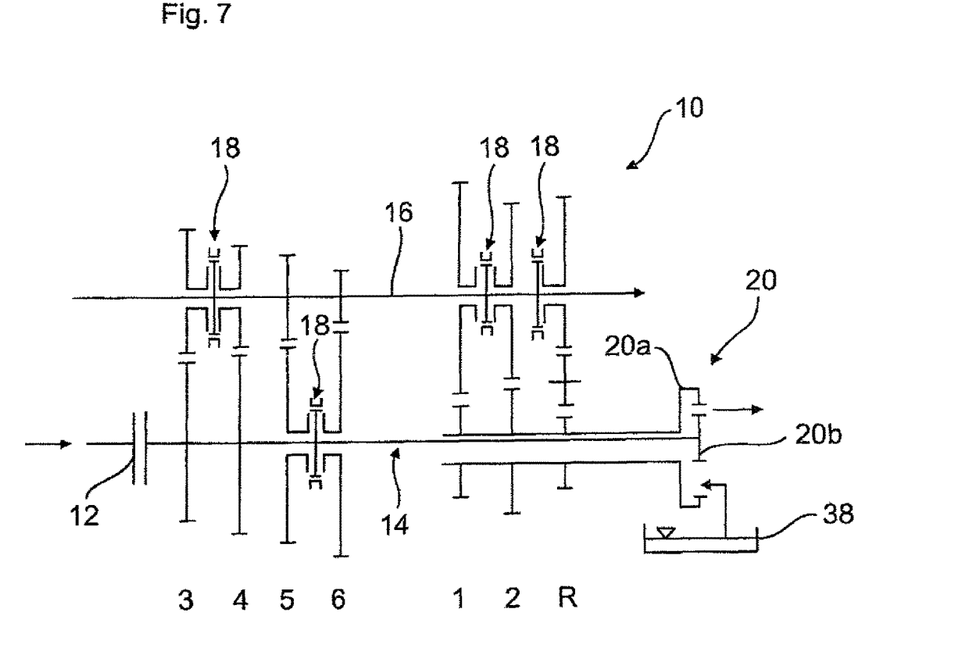
FIG. 7 a manual transmission according to FIG. 3, in which the ring gear stage which is arranged on the input shaft is also configured a gearwheel pump for supplying hydraulic fluid for a transmission control.

In the transmission 10 according to FIG. 7 the ring gear stage 20 is arranged on the free end side of the input shaft 14 or the hollow shaft 14b.

Beside these functions as transmission stage, the ring stage 20 is also configured in cooperation with housing elements of the transmission 10 as gearwheel crescent pump, which aspirates hydraulic fluid, for example gear oil, form an oil sump 38 as indicated with arrows, and supplies the hydraulic fluid under pressure to a not shown electro-hydraulic transmission control. The crescent pump can be of known construction with a suction pressure chamber formed in the housing and correspondingly provided suction and supply channels.

Figure 8:
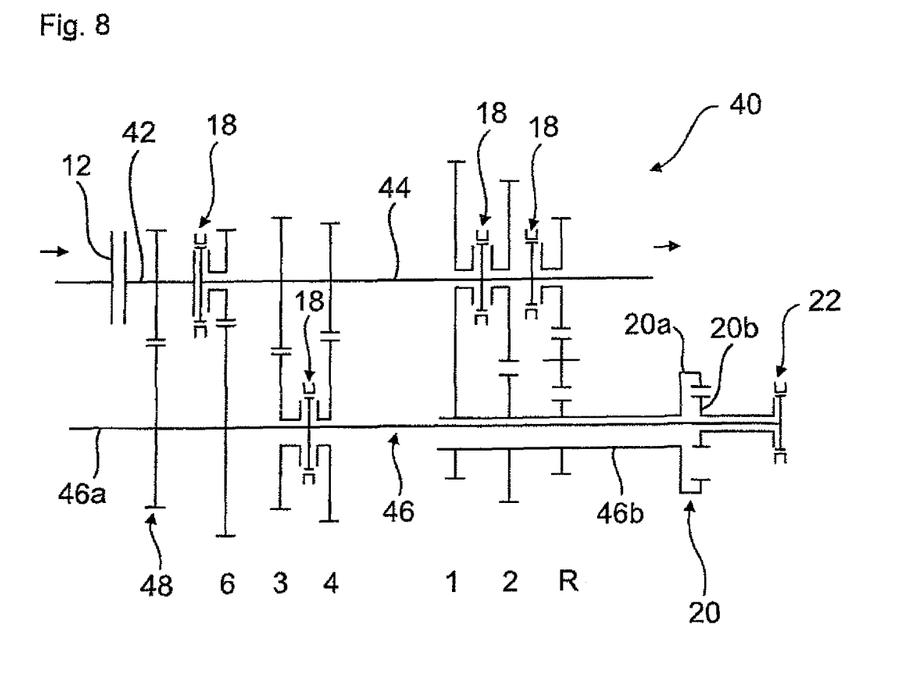
FIG. 8 a further manual transmission for motor vehicles with an input shaft, a coaxial output shaft and an axially parallel layshaft, which is configured two-part and is drivingly connected via a ring gear stage.

FIG. 8 shows a transmission 40 with an input shaft 42, a coaxial output shaft 44 and an axially parallel layshaft 46, wherein the layshaft 46 is configured two-part and has the ring gear stage 20 with the shifting clutch 22.

The layshaft 46 includes a subshaft 46a and a reverse driving hollow shaft 46b, which are interconnected via the ring gear stage 20 as described above.

Beside the gear wheels of the gear sets 3, 4, 6 or 1, 2, R arranged between the output shaft 44 and the layshaft 46, a fixed (not switchable) gear set 48 is provided on the input shaft 42 and the layshaft 46a, via which gear set 48 the layshaft 46 is constantly driven.

Further, beside the forward drive 6 a direct drive, for example as forward gear 5, can be shifted via the synchronous clutch 18 provided between the input shaft 42 and the output shaft 44, in which the input shaft 42 and the output shaft 44 are directly connected with each other.

Driven via the gear wheel set 48, the forward gears 3, 4, 6 can be shifted, or respectively driven via the ring gear stage 20, the forward gears 1, 2 and the reverse gear R can be shifted as described above. In addition the gear sets of the forward gears 1, 2 and of the reverse gear R can be turned off by means of the shifting clutch 22, when driving in the higher forward gears 3 to 6.

What is claimed is:

1. A change-speed transmission for a motor vehicle, having a plurality of forward gears and a reverse gear, comprising:
   at least one input shaft, an output shaft and a layshaft operatively connected by idler gear wheels and fixed gear wheels of gear sets which form the plurality of forward gears and the reverse gear,
   wherein at least one of the at least one input shaft, the output shaft and the layshaft is comprised of two subshafts defined by respective rotation axes and is supported in a housing of the transmission so that the rotation axes are offset to each other by an axial offset, wherein one of the two subshafts has a greater distance to another one of the at least one input shaft, the output shaft and the layshaft than the other one of the two subshafts and carries gear wheels of lower ones of the forward gears and optionally gear wheels of the reverse gear; and
   a ring gear stage operatively connecting the two subshafts, and having an internally splined ring gear and an externally splined spur gear meshing with the ring gear.

2. The change-speed transmission of claim 1, constructed as manual transmission.

3. The change-speed transmission of claim 1, wherein the ring gear stage is arranged on the input shaft between the gear sets that form higher ones of the plurality of forward gears and the gear sets that form lower ones of the plurality of forward gears and the reverse gear.

4. The change-speed transmission of claim 1, wherein the ring gear stage is provided on the output shaft between the gear sets that form higher ones of the plurality of forward gears and the gear sets that form lower ones of the plurality of forward gears and the reverse gear.

5. The change-speed transmission of claim 1, wherein the input shaft is comprised of the two subshafts, with one of the two subshafts being constructed as a reverse driving hollow shaft and the other one of the two subshafts being constructed as a continuous shaft, wherein the ring gear stage is arranged between the continuous shaft and the hollow shaft, and wherein the hollow shaft has a greater distance to the output shaft than the continuous shaft and carries the gear sets of the lower ones forward gears and the reverse gear.

6. The change-speed transmission of claim 1, wherein the output shaft is comprised of the two subshafts, with one of the two subshafts being constructed as a reverse driving hollow shaft and the other one of the two subshafts being constructed as a continuous shaft, wherein the ring gear stage is arranged between the continuous shaft and the hollow shaft, and wherein the hollow shaft has a greater distance to the output shaft than the continuous shaft and carries the gear sets of the lower ones of the forward gears and the reverse gear.

7. The change-speed transmission of claim 1, further comprising a shiftable clutch, wherein a connection between a drive of the motor vehicle and the ring gear stage is interruptible by the shiftable clutch.

8. The change-speed transmission of claim 7, wherein the ring gear stage and the shiftable clutch are arranged on the input shaft, and wherein the idler gear wheels of corresponding ones of the lower gear sets are positioned on the output shaft.

9. The change-speed transmission of claim 1, wherein the ring gear stage is arranged on the input shaft, wherein the output shaft is constructed as a hollow shaft through which a further output shaft of an integrated interaxle differential extends, wherein the output shaft outputs onto a differential housing of the interaxle differential, and the further output shaft outputs onto an axle differential opposite the interaxle differential.

10. The change-speed transmission of claim 1, wherein the input shaft and the output shaft are arranged coaxial, and the ring gear stage is arranged on the layshaft, said layshaft carrying the gear wheels.

11. The change-speed transmission of claim 1, wherein the ring gear stage is constructed as a crescent pump for transporting lubricant oil or hydraulic oil.

12. The change-speed transmission of claim 1, further comprising a pawl pivotally provided on a housing of the transmission, said ring gear being arranged on the output shaft and having an external spline, said external spline cooperating with the pawl so as to form a parking lock of the transmission.

* * * * *